June 30, 1953    HIROSHI SUZUKAWA    2,643,597
FLASH SYNCHRONIZER FOR CURTAIN SHUTTER CAMERAS
Filed Sept. 5, 1950    3 Sheets-Sheet 1

INVENTOR
HIROSHI SUZUKAWA
BY
ATTORNEY

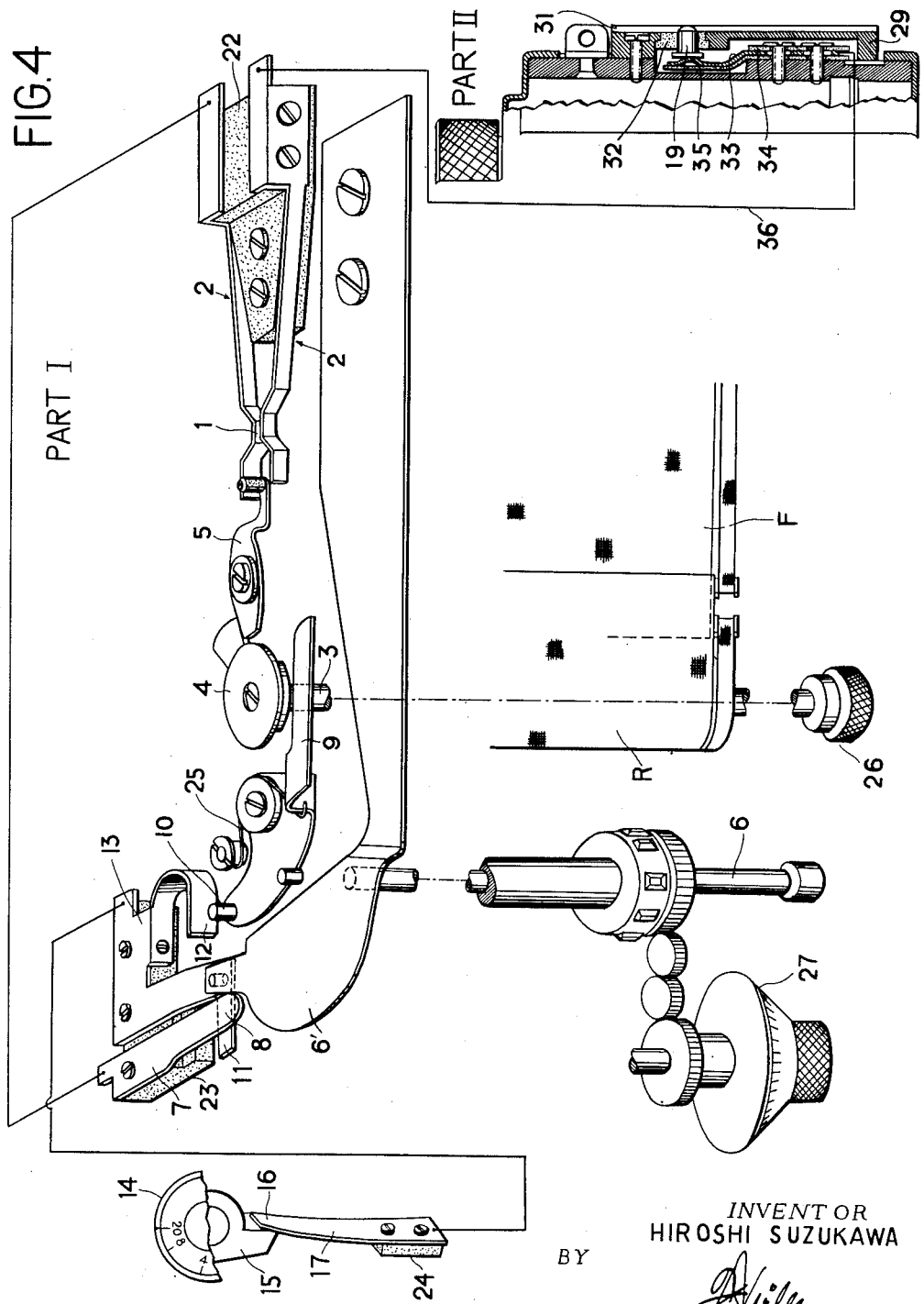

June 30, 1953     HIROSHI SUZUKAWA     2,643,597
FLASH SYNCHRONIZER FOR CURTAIN SHUTTER CAMERAS
Filed Sept. 5, 1950     3 Sheets-Sheet 3
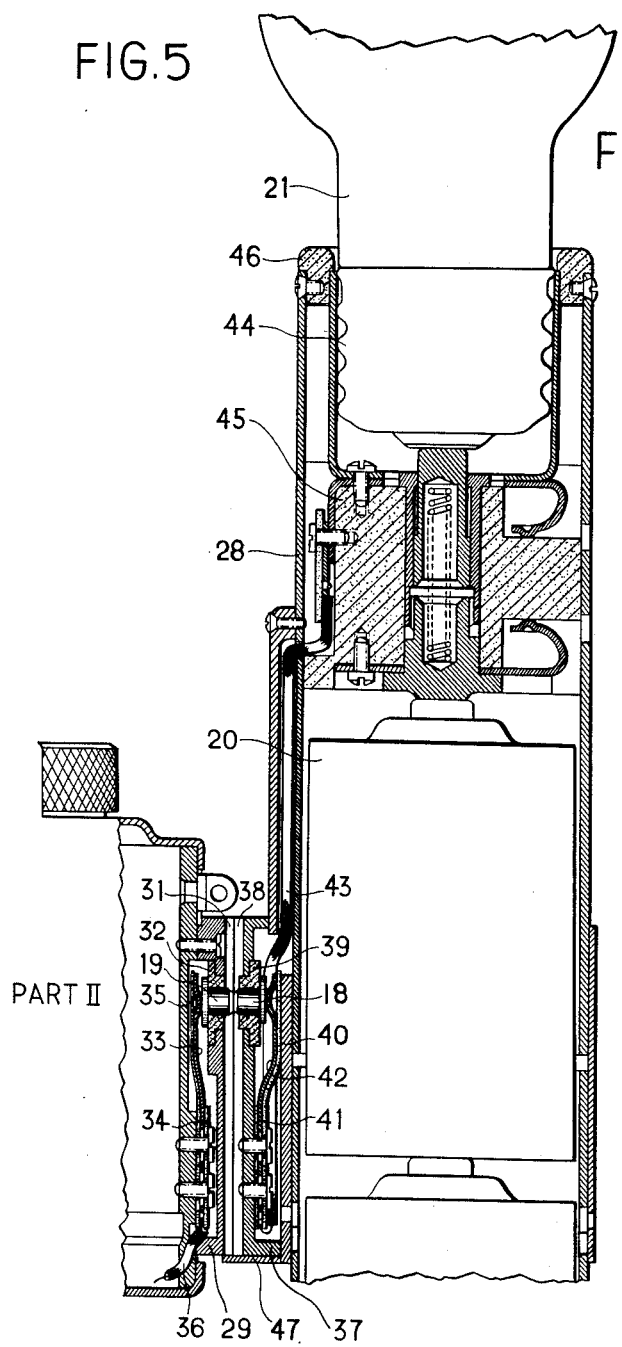
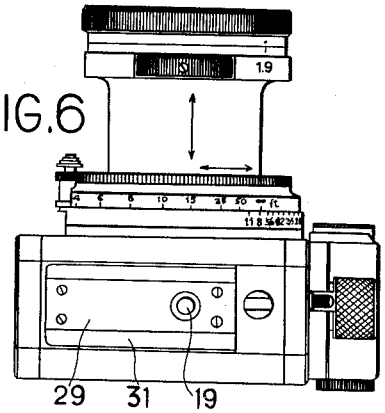
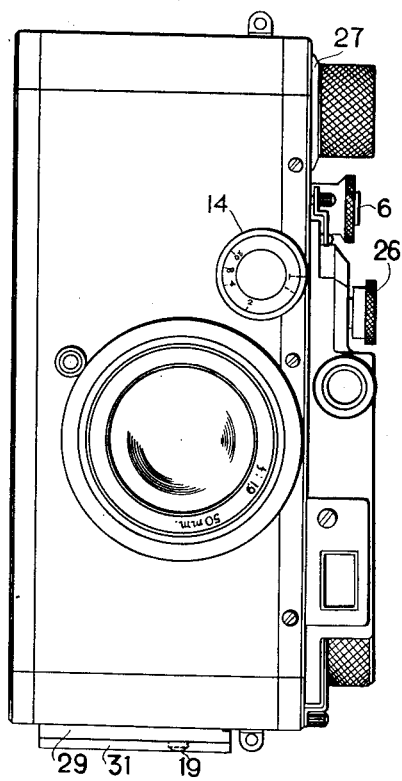
INVENTOR
HIROSHI SUZUKAWA
BY
ATTORNEY Patented June 30, 1953

2,643,597

UNITED STATES PATENT OFFICE 2,643,597

FLASH SYNCHRONIZER FOR CURTAIN SHUTTER CAMERAS

Hiroshi Suzukawa, Suginami-Ku, Tokyo, Japan, assignor to Canon Camera Company, Ltd., Chuouku, Tokyo, Japan, a corporation of Japan Application September 5, 1950, Serial No. 183,194
In Japan December 21, 1948

9 Claims. (Cl. 95—11.5)

This invention relates to the apparatus for automatically and exactly synchronizing the firing time of the flash bulb with the movement of the shutter of a camera particularly the focal plane shutter type.

The principal object of the present invention is to provide a positive correlation between the configuration of the firing circuit and the shutter speed, and to obtain this correlation by a single adjustment, namely, by setting the shutter speed dial for the desired exposure.

Another object of this invention is to obtain a form of flash bulb circuit of which most of the elements are used both when the circuit is to cause firing on initiation of shutter motion or during a later portion of the shutter movement when making an exposure.

A further object of this invention is to firmly affix the flash lamp casing as an attachment on one side of the camera in order that the positive basic connection of the parts of the said electrical circuit for synchroflash may be maintained.

Still a further object of the invention is to provide a compact electrical circuit, common to all shutter speeds and to both short-peaked and long-peaked flash bulbs, which is readily built into the small flat space in the bottom region of the camera without visibly increasing the size of the camera housing.

Still a further object of the invention is firmly to attach the flash bulb to the camera housing at a region other than the accessory clip provided for affixing the usual universal finder, leaving the accessory clip free for other uses even when making flash photographs.

The constructions, functions and features of the apparatus according to this invention may be more fully understood by reference to the accompanying drawings in which:

Fig. 1 is a diagram showing the relation between the movement of the focal plane shutter and the burning of the flash bulb, in which (A) and (B) are for the high shutter speed and the low shutter speed respectively.

Figures 2 and 3 are diagrammatic views of the synchronous flashing circuit of my invention showing in simple and clear form the essential parts thereof in their relative positions electrically and to some extent spatially, with Figure 2 showing the elements as positioned when the flash is to be operated instantly upon actuation of the exposure shutter and Figure 3 showing the elements as positioned when the flash is to be operated at an interval after initiating movement of the exposure shutter.

Figure 4 is a perspective and partially exploded view of the mechanical parts of the circuit of Figures 2 and 3 in which the relation thereof to some normally-present camera parts is indicated.

Fig. 5 is a sectional view showing the mode of affixing the flash lamp casing to the camera.

Figs. 6 and 7 are respectively the side view and front view of the curtain shutter type camera to which this invention may be chiefly applied.

Figure 1:
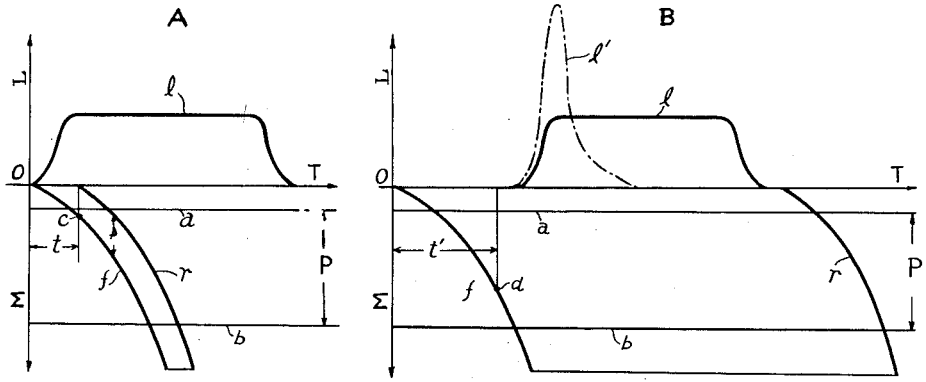

Referring to Fig. 1, in which the intensity of illumination L of the flash and the time T are respectively plotted as positive ordinates and abscissas as generally known, it may be seen that there exist two kinds of flash of which the illumination curves are shown by a flat curve $l$ and a peak curve $l'$. And if the magnitudes of the movement M of the focal plane shutter are plotted as negative ordinates, and P represents the length of the photographic picture, it is also a well known fact that the curves of movement of the leading or front and following or rear shutters may be shown by $f$ and $r$ respectively, and at high shutter speeds the rear shutter starts after the front shutter with the time interval $t$, that is to say, the rear shutter starts when the front shutter has reached the point $c$, and thereafter both shutters run over the surface of the picture keeping the slit $s$ between them as may be seen at Fig. 1 (A) while in the low shutter speeds the front shutter completely uncovers the full length of the photographic picture for some time before the rear shutter follows to cover the picture surface, as may be seen in Fig. 1 (B).

For low shutter speeds then, as shown in Figure 1 (B), any flash will meet the requirements if it has the necessary intensity of illumination at any arbitrary time within the period of the opening of the picture surface and throws the necessary amount of light uniformly on the picture surface. In other words, the flash will meet the requirements if it is fired at the time that the front shutter has reached $d$ and is burnt before the closure of the rear shutter. Therefore, in the case of synchronizers for low shutter speeds both kinds of the flash bulbs of either the $l$ curve of Figure 1 (A) or the $l'$ curve of Figure 1 (B) may be effectively used. But in the case of high shutter speeds in which the slit between the front and rear shutters travels over the picture surface, it is obvious that the flash must have the highest intensity of illumination at the time that the said slit reaches the position coincident with the front edge $a$ of the picture, and then must sustain the same intensity of illumination until the slit completely passes beyond the rear picture edge $b$.

With the synchroflash apparatus of this invention both of the differing requirements mentioned above as to the high and low shutter speeds are fulfiled, and the changes which must be made in the flashing circuit in view of these differing requirements are readily made by a simple mechanical operation which is necessary, in any event, in adjusting for the desired exposure in the low speed range from a prior setting within the high speed range and comprises causing the 20-mark, corresponding to an exposure of one-twentieth second, of the low speed dial of miniature cameras of the curtain shutter type to register with the fixed reference mark of the scale on the camera body.

Figure 2:
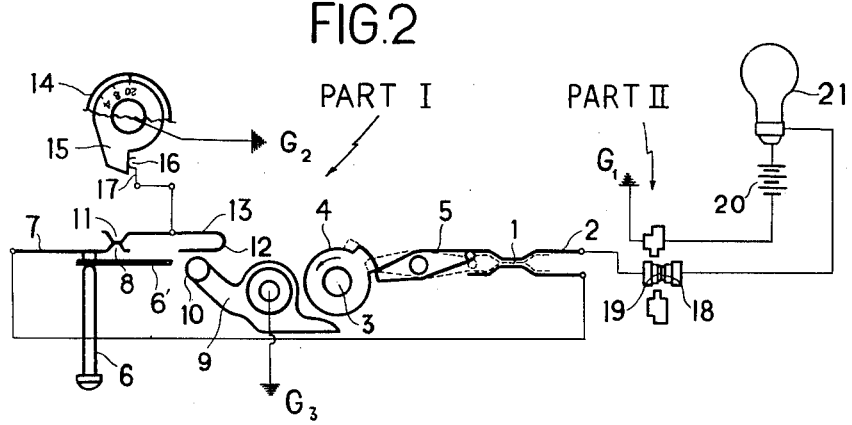
Figure 3:
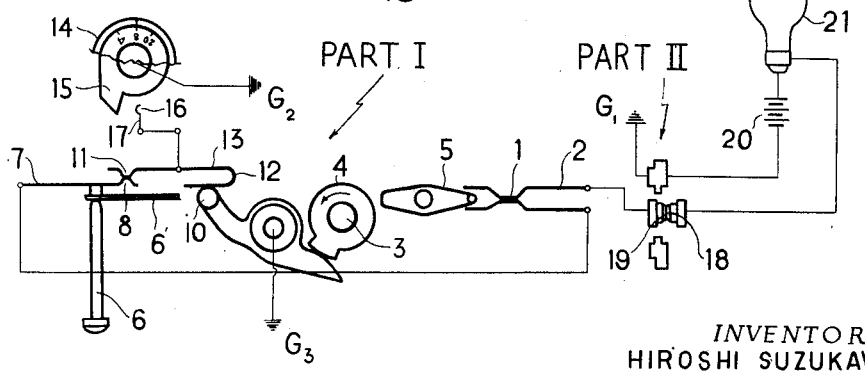

The apparatus according to the present invention comprises two mechanical assemblies, which in Figures 2 to 4 are referenced as Part I and Part II respectively, with Part I so constructed that its major portion can be built in the bottom portion of the camera of the type shown in Figs. 6 and 7, while Part II is attached on one side of the camera as shown most clearly in Figures 4 and 5.

Part I comprises a circuit element 2 of fork shape of elastic material having a tendency to close at the point 1, a cam 4 fixed on the winding shaft 3 of the front shutter, or on a shaft cooperative with the shaft 3, a lever 5 with an insulating end for maintaining the fork 2 in open state, a circuit element 7 of plate spring form having a contact end 8, a lever shaped circuit element 9 rotatable by the cam 4, a U-shaped circuit element 13 having the contact ends 11 and 12, the contact end 11 being controllable by the shutter button 6 with the aid of plate spring 6' to engage the contact end 8, the contact end 12 being positioned to be engaged by the contact end 10 of the circuit element 9 when the latter is moved by cam 4, and the plate circuit element 17 electrically connected with said circuit element 13 and having a contact end 16 for the movable contact end 15 of the low shutter speed dial 14 which operates as a circuit element by itself. Part II has a terminal 19 connectable with the terminal 18 of the flash lamp casing upon the fitting of the casing to the camera.

Referring now to the embodiment of this invention shown in Figs. 2, 3 and 4, in the case of high shutter speed photography if the mark (20) of the shutter speed dial 14 is brought to the position at which it registers with the fixed exposure reference mark of the scale, the contact ends 15 and 16 will contact with each other. Upon depressing the shutter button 6 the front shutter will start and the contact ends 8, 11 will contact with each other at the same time (the provision of the latter contact ends forms a safety device for preventing accidental firing of the flash bulb which might otherwise occur upon fitting a new bulb before the winding up of the shutter), and the cam 4 will turn in the direction from the rest position shown by the full line in Figs. 2 and 4 to the position shown by the chain line in Fig. 2, releasing the elastic fork 2 from the restriction of cam 4 and lever 5 so that the prongs of fork 2 close at 1 and cause flash bulb 21 to be fired simultaneously with the closure of the high speed circuit, i. e., camera body $G_1$, battery 20, flash bulb 21, terminals 18, 19, circuit elements 2, 7, 13, 17, 14 and camera body $G_2$. When the front shutter in its movement reaches the position corresponding to the point $d$ in Fig. 1(B), the cam 4 will turn the circuit element 9 as may be seen in Fig. 3 and will cause engagement between the contact ends 10 and 12. But this closure of the low speed circuit has no effect as the flash bulb has been fired already.

For low shutter speed photography with a flash bulb, that is any speed below the 20 mark ($\frac{1}{20}$ second) on the low shutter speed dial, such lower speed dial reading, for example the 8-mark ($\frac{1}{8}$ second), is brought to register with the fixed exposure reference mark. Obviously as the result of so registering the intended low speed and the exposure reference mark, plate 17 turns with the low shutter speed dial 14 and its contact end 15 no longer engages contact end 16 of circuit element 13. Hence, since the contact 10 of circuit element 9 is disengaged from contact 12 of circuit element 13, the firing circuit can not be closed even when a portion thereof is closed at the circuit elements 7, 13 and 2 in unison with the pushing of the shutter button 6 and the starting of the front shutter. When, thereafter, the cam 4 in its rotation actuates circuit element 9 and causes the latter to pivot so as to engage contact 10 with contact 12, the low speed circuit i. e. camera body $G_1$, battery 20, terminals 18, 19, circuit element 2, 7, 13, 9 and camera body $G_3$, may be closed.

According to this invention, as disclosed above, a very simple construction may be obtained and almost all of the parts of the apparatus may be built in the flat portion of the bottom of a camera without visible change of the size of the camera on account of the use made of almost all of the mechanical portions as circuit elements common to both the low and high speed circuits. Elements 22, 23 and 24 of Part I in Fig. 4 are the insulating pieces inserted between the camera and the circuit elements 2, 13 and 17, while 25 identifies the spring which biases lever 9 so that it normally disengages contact end 12. The high shutter speed dial is referenced 26, and the exposure counter 27.

Referring to Figures 4, 5, 6 and 7, Part II, attached to one side of the camera body, comprising a metallic grooved member 29 having lateral rails 31, is adapted to receive the closely fitting metal lug 37 integral with the battery casing 28 of the flash equipment. Terminal 19 projecting through the ring 32 of insulating material in the grooved member 29 and adapted to engage terminal 18 of the lug 37, is resiliently maintained in its pushed out position by the metal plate spring 33. Plate spring 33 is insulated from the camera body by the insulating members 34 and 35 and is electrically connected by the cord 36 to the upper prong of fork switch 2.

Rails 38 of the lug 37 are adapted to engage with rails 31 of the grooved member 29 when the flash equipment is attached to the camera. Terminal 18 of the lug 37 is mounted therein similar to the mode of mounting terminal 19 in the grooved member 29, projecting through the insulating ring 39 and continuously pressed outwardly by plate spring 42. Spring 42 is insulated from the flash and battery casing 28 by the insulating members 40 and 41, while terminal 18 is electrically connected to the socket 44 for the flash bulb 21 by the cord 43. Socket 44 is supported at its base by insulating spacer member 45 and about its upper rim by insulating ring 46 in the battery casing. The projecting member 47 at the lower end of lug 37 extends to engage the lower end of grooved member 29 and automatically locks thereto by known means, not shown in the drawing, when the rails 31 and 38 are in proper cooperating position. As described above, upon affixing the battery casing 28 to the camera, the circuit is completed as shown in Figs. 2 and 3 and the flash bulb may be fired synchronously with depression of the shutter button to close the completed circuit at the predetermined portion of the picture exposing movement of the shutter.

The above description and accompanying drawings are illustrative of the invention, but are not to be interpreted as limiting the scope of the invention to the particular embodiment so shown and described.

What I claim is:

1. A synchronizer for electrically firing a photoflash bulb in one of two selectable time relations with the movement of a camera shutter, comprising a shutter roller shaft, a cam having a single dwell driven by the roller shaft, a first pivoted lever of which one arm is held deflected by the cam dwell in the pre-operated position of the shutter shaft, a second pivoted lever of which one arm extends into a predetermined path portion of the cam dwell, a self-closing electrically conductive switch having two contacts, a source of potential and a flash bulb being adapted to be connected serially from one of said two contacts to ground, the held deflection of said one arm of the first lever maintaining the said one contact disengaged from the other contact, a depressible shutter shaft release mechanism, a switch blade depressable by the shutter shaft release mechanism, a third fixed contact, an electrical connection from the other of the two said contacts to the third fixed contact, a fourth fixed contact adapted to be engaged by the other arm of the second lever when the second lever is deflected at the predetermined portion of the cam dwell path, a flexible arm electrically connected to the fourth fixed contact extending over the third fixed contact and held from engagement therewith in the unoperated condition of the release mechanism by the blade, an electrical connection from the second lever to ground, a shutter speed adjustment shaft, an electrically conductive arm integral with the speed adjustment shaft, a fifth fixed contact electrically connected to the fourth fixed contact, the said conductive arm being adjustably positionable to engage the fifth contact for shutter speeds greater than a predetermined speed and to disengage the fifth contact for shutter speeds less than the predetermined speed, and a connection from the movable integral conductive arm to ground, whereby on depressing the shutter shaft release mechanism the flash bulb is fired in one of the two time relations in accordance with the position of the arm integral with the shutter speed adjustment shaft relative the fifth fixed contact.

2. A photoflash mechanism for firing a flash lamp in synchronism with the movement of the focal plane shutter of a camera at a selected one of two predetermined portions of the movement of the shutter, comprising a shutter winding mechanism, a cam having a single dwell rotatable by the winding mechanism, a first and a second switch each having a fixed and a movable contact, a pivotable lever for each the first and second switches and having one end in the path of movement of the cam dwell, the lever for the first switch holding the movable contact of the first switch from its fixed contact by the cam dwell when the shutter mechanism is wound preparatory to an exposure, the other end of the pivotable lever for the second switch forming the movable contact of the second switch and being disengaged from the fixed contact of the second switch on so winding the shutter mechanism, a source of potential and a flash lamp connected between the movable contact of the first switch and ground, a ground connection to the movable contact of the second switch, a shutter speed adjustment means, a third switch having a fixed contact electrically connected to the fixed contact of the second switch and a grounded movable contact operable by the shutter speed adjustment means to engage the third switch fixed contact at shutter speed settings greater than a predetermined shutter speed and to disengage the third switch fixed contact at shutter speed settings less than the predetermined shutter speed, a fourth switch having a movable contact integral with the fixed contact of the second switch and a cooperating fixed contact electrically connected to the movable contact of the first switch, and manually operable means for mechanically tripping the wound shutter winding mechanism and releasing the movable contact of the fourth switch to engage its cooperating fixed contact, the tripped shutter mechanism rotating the cam to remove the dwell from the one end of the lever for the first switch to permit closure of the movable contact of the first switch with its fixed contact to fire the lamp provided the movable and fixed contacts of the third switch engage each other substantially at the initiation of rotation of the cam and leaving the lamp unfired when the contacts of the third switch are disengaged from each other, and firing the lamp later in the rotation of the cam when the cam dwell actuates the pivotable lever for the second switch to engage the other end of the lever to the fixed contact of the second switch.

3. A photoflash mechanism according to claim 2 in which at least the movable contact of the first switch is a formed flat spring tending normally to engage its cooperating fixed contact, and the pivotable lever for the first switch has its other arm of insulating material and is adapted to hold the adjacent end of the movable contact spring in such position as to disengage the movable contact from the fixed contact when its one arm is engaged by the cam dwell on winding the shutter winding mechanism preparatory to an exposure.

4. A photoflash mechanism according to claim 2 in which the fixed contact of the second switch is a U-shaped flat spring of electrically conductive material, the pivotable lever for the second switch is of electrically conductive material, and a formed biasing spring tends to disengage the other end of the lever forming the movable contact of the second switch from the U-shaped spring at all times the cam dwell does not engage the one end of the lever.

5. A photoflash mechanism according to claim 2 in which the fixed contact of the second switch is a U-shaped flat spring of which the arm engageable by the other end of the lever for the second switch is freely depressible toward its other arm which is spatially fixed, and a spring biases the lever for the second switch so that the movable contact of the second switch is disengaged from its fixed U-spring contact at all times the lever is not engaged by the cam dwell, the free arm of the fixed contact assisting in restoring the lever after engagement and subsequent disengagement with the cam dwell to the contact disengaging position.

6. A photoflash mechanism according to claim 2 in which the movable contact of the fourth switch is an L-shaped flat spring integral with the fixed contact of the second switch, the fixed contact of the fourth switch extending over an arm of the L-shaped movable contact, and a spring blade spatially fixed at one end has its free end in the path of the mechanical tripping means of the shutter winding mechanism and maintains the L-shaped movable contact disengaged from its cooperating fixed contact at all times other than during operation of the tripping mechanism.

7. A photoflash mechanism according to claim 2 in which the arms of the lever for the first switch are aligned with each other, its one arm extending into the initial portion of the path of the cam dwell, the lever of the second switch is an angle lever having its one arm extending into a predetermined intermediate portion of the cam dwell path, its other arm extending at an obtuse angle in respect of the one arm, and a biasing spring maintains the other arm out of engagement with the fixed contact of the second switch whenever the cam dwell is disengaged from its other arm.

8. A photoflash mechanism according to claim 2 in which the cam, each contact of each switch, and the pivotable levers are substantially coplanar parallel to the length of the camera and are housed in the bottom region of the camera.

9. A photoflash mechanism for firing a flash lamp in timed relation with the movement of the shutter of a camera at one of two predetermined portions of the shutter movement, comprising a shutter winding mechanism, a release for the shutter winding mechanism, a single dwell cam rotatable with the shutter winding mechanism, an electrical circuit including a source of potential, a flash lamp and four pairs of switch contacts for closing the circuit in timed relation with an exposure on operation of the shutter winding release, each pair of switch contacts having a fixed and a movable contact, the movable contact of the first pair being a spring tending to engage the fixed contact of the first pair, the movable contacts of each the first, second and third pairs being electrically interconnected while the movable contact of the fourth pair is electrically connected to the fixed contact of the second pair and the movable contact of the first pair is electrically connected to the fixed contact of the fourth pair, settable shutter speed adjusting means, the movable contact of the third pair being positioned on the speed adjusting means to engage the fixed contact of the third pair for all shutter speeds above a predetermined value and to disengage the fixed contact of the third pair for all shutter speeds below the predetermined value, spring means in the path of the release maintaining the movable contact of the fourth pair disengaged from the fixed contact of the fourth pair, the movable contact of the second pair comprising a pivotable angle lever having one arm in an intermediate portion of the path of the cam dwell, a spring biasing the angle lever to disengage from the fixed contact of the second pair at all times the one arm of the angle lever is disengaged from the dwell of the cam, and a pivoted lever having one arm engaging the movable contact of the first pair and its other arm in the initial portion of the cam dwell path and engaged by the dwell of the cam when the shutter winding mechanism is wound preparatory to an exposure to cause the one arm to disengage the movable contact of the first pair from the fixed contact of the first pair, whereby on actuation of the release the spring means is moved to permit engagement of the movable and fixed contacts of the fourth pair and the cam dwell rotating from its initial position releases the lever permitting the movable contact of the first pair to engage the fixed contact of the first pair to fire the flash lamp if the contacts of the third pair are in contact with each other and leaving the lamp unfired if the contacts of the third pair are disengaged from each other until the cam dwell actuating the angle lever engages the latter with the fixed contact of the second pair.

HIROSHI SUZUKAWA.

References Cited in the file of this patent

UNITED STATES PATENTS

| Number | Name | Date |
| --- | --- | --- |
| 2,049,735 | Grogin | Aug. 4, 1936 |
| 2,123,112 | Krueger | July 5, 1938 |
| 2,224,674 | Filsinger | Dec. 10, 1940 |
| 2,277,233 | Kende | Mar. 24, 1942 |
| 2,298,107 | Carr | Oct. 6, 1942 |
| 2,455,365 | Jenner | Dec. 7, 1948 |
| 2,517,407 | Nilson | Aug. 1, 1950 |
| 2,520,638 | Hulstein | Aug. 29, 1950 |
| 2,552,213 | Pribus et al. | May 8, 1951 |

FOREIGN PATENTS

| Number | Country | Date |
| --- | --- | --- |
| 724,336 | Germany | Aug. 24, 1942 |